(No Model.)
G. H. WALDO.
WASHING MACHINE.
No. 359,479. Patented Mar. 15, 1887.
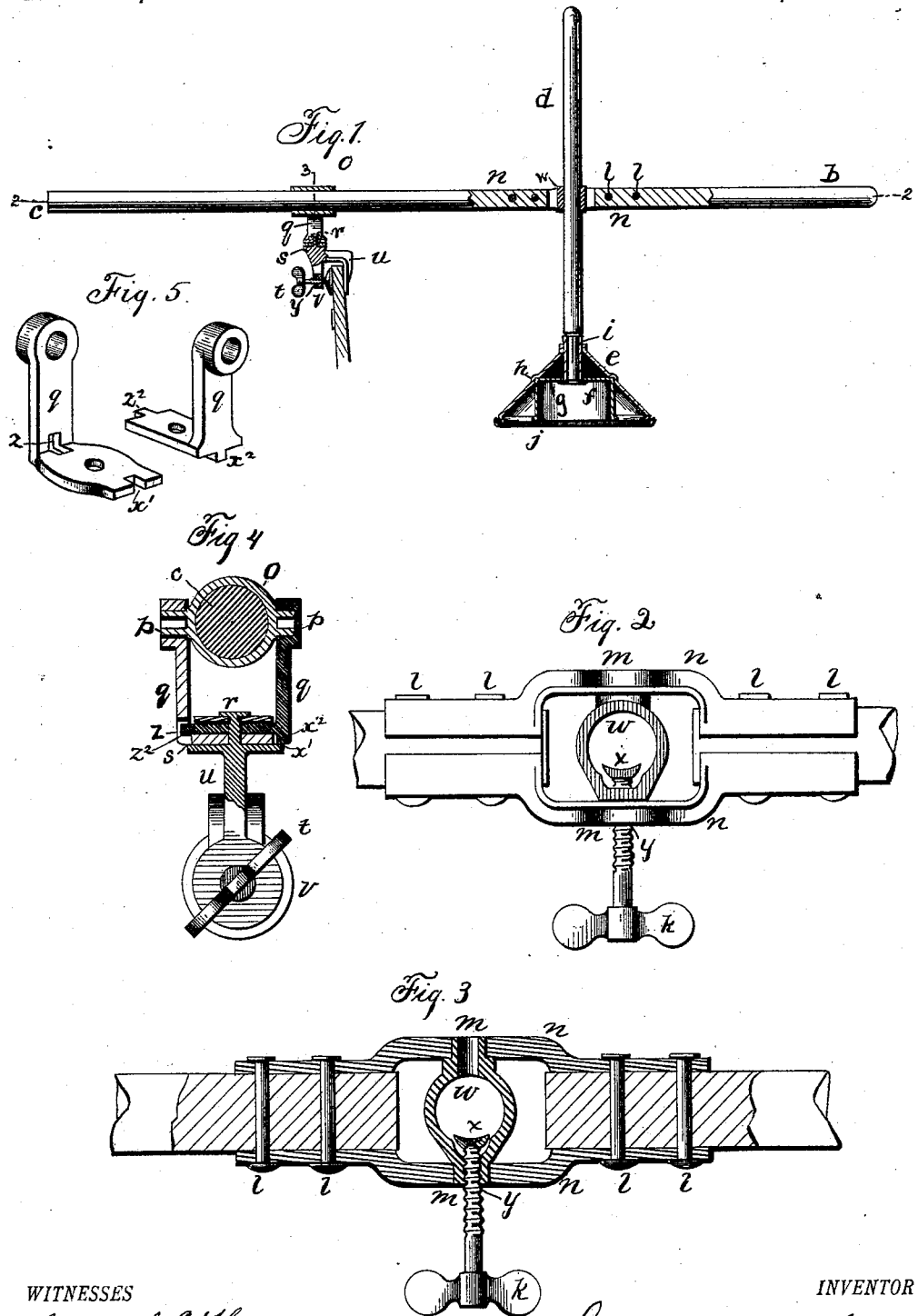
WITNESSES
Samuel E Thomas
N. S. Wright.
INVENTOR
George H Waldo

UNITED STATES PATENT OFFICE.

GEORGE H. WALDO, OF DETROIT, MICHIGAN.

WASHING-MACHINE.

SPECIFICATION forming part of Letters Patent No. 359,479, dated March 15, 1887.

Application filed July 17, 1885. Serial No. 171,827. (No model.)

*To all whom it may concern:*

Be it known that I, GEORGE H. WALDO, a citizen of the United States, residing at Detroit, in the county of Wayne and State of Michigan, have invented a new and useful Machine for Washing Clothes, of which the following is a specification.

My invention relates to improvements in that class of washing-machines known as "lever-pounder washers;" and the object of my improvements is to simplify and better adapt such machines for their work.

Figure 1 is a longitudinal sectional view cut vertically through the machine. Fig. 2 shows a view of the lever and its central connections, looking down thereon. Fig. 3 is a horizontal sectional view of the central part of the lever on line 2 of Fig. 1, and showing its means of attachment, and also the staff-clamp and its swiveled bearings, foot-piece, and thumb-screw. Fig. 4 shows the swiveled rocking ferrule in a vertical sectional view on line 3 of Fig. 1, and also its connection with the tub-clamp, its bearings and attachments. Fig. 5 represents detached perspective views of the two L-shaped parts having the bearings for the lever-supporting ferrule.

Fig. 1 represents the machine as attached to a portion of a common wash-tub or other vessel in which are the goods to be washed, the tub-clamp being attached on the opposite side of the tub from which the operator stands while grasping the short end of the lever with one hand and steadying the upright or staff-handle with the other hand. The handle end of the lever $b$ is shorter than the portion on the opposite end of the central clips. $c$ is the sliding end of the lever; $d$, the upright staff-handle to the pounder; $e$, the body of the pounder-head; $f$, an internal cup; $g$, the bottom of said cup; $h$, a head in the body of the pounder; $i$, the ferrule in which the staff-handle $d$ is inserted; $j$, the bottom of the pounder; $k$, a thumb-screw to staff-clamp; $l\ l$, the rivets that attach the clips to lever $b\ c$; $m\ m$, staff-clamp bearings in the central clip; $o$, rocking ferrule; $p\ p$, bearings to rocking ferrule; $q\ q$, upright ears of U-shaped swivel; $r$, swivel-pin to tub-clamp; $s$, swivel bearing-surface to tub-clamp; $t$, thumb-screw to tub-clamp; $u$, tub-clamp; $v$, foot-piece to tub-clamp thumb-screw; $w$, staff-clamp ferrule; $x$, staff-clamp foot-piece; $y$, cast threads on thumb-screws and nuts.

Having given the letters of reference, I will now proceed to describe its construction, to enable those skilled in the art to build and use my invention.

The lever is made of two sections, $b$ and $c$, of suitable size and length and material, but preferably of wood turned round, and about one and one-eighth of an inch in diameter. The central clips, $n\ n$, are concave at each end, and their concave surfaces nearly fit the circle of the inner ends of the lever $b$ and $c$, one on each opposite side of said lever, and are riveted firmly together by the rivets $l\ l$; or other suitable means may be used to firmly connect the lever $b\ c$ and leave a space between their inner ends.

The clips $n\ n$ are curved outwardly, as shown in Fig. 2, and are provided with central holes or bearings, $m\ m$, in which the ends of the staff-clamp $w$ are inserted, so as to allow the staff-clamp to rock when the lever is raised up or pressed down, and by this means the staff-handle can be held in a perpendicular position, while the face of the pounder comes down flat on the goods at any position of the lever $b\ c$. It will also be seen that by this means I can get a central pressure down on the pounder, and at the same time, as will be shown, I can adjust the staff-handle $d$ up or down at any point that may be desired in the rocking staff-clamp $w$, which consists of a short tube provided with an upright hole of sufficient size to easily admit the staff-handle $d$, and recessed on one side to allow the foot-piece $x$ to drop back when the thumb-screw $k$ is adjusted, so as to allow the staff-handle $d$ to pass up through the staff-clamp to any desired position. Then by turning up the thumb-screw $k$ the staff-handle will be grasped between the foot-piece $x$ and the opposite side of the staff-clamp ferrule, and thus firmly held in its various adjustments.

The projecting bearings which extend out on opposite sides from the staff-clamp are fitted into the central bearing-holes, $m\ m$, in the clips $n\ n$, and one of them is provided with a threaded hole, which is cast into its inner surface and forms a nut for the thumb-screw $k$ in line with the recess for the foot-piece $x$. The other bearing is provided with a hole lengthwise through it, for the purpose of riveting the foot-piece $x$ to the thumb-screw $k$ by introducing a punch through it. As this hole stands opposite the foot-piece, it will be seen that the nut rocks with the staff-clamp and staff-handle without any tendency to loosen the thumb-screw $k$, irrespective of the position of the lever $b\ c$. The portion $c$ of the lever is adapted to slide through the rocking ferrule $o$, thus giving the pounder its longitudinal movement across the tub or other vessel that contains the clothes. This ferrule $o$ is also provided with ears or journals $p\ p$ on opposite sides, which fit into corresponding boxes or holes in the upper portion of the jaws of the U-shaped swivel, as shown in Fig. 4. Thus the lever $b\ c$ is allowed a free movement up and down at its end $b$, and by means of the described parts the pounder can be operated up and down and longitudinally across the tub. The tub-clamp $u$ is provided with a circular horizontal-faced swivel-bearing, $s$, and swivel-pin $r$, which is tenoned, and upon which the lower portion of the U-shaped swivel $q\ q$ moves.

The U-shaped swivel $q\ q$ is made in two parts and provided with lugs and recesses to correspond, as shown, the lug $z^2$ projecting horizontally into the recess $z$ and the lug $x^2$ projecting downward into the recess $x'$. When the pivot-pin $r$ is passed through the hole provided in the lower portions of the U-shaped swivel $q\ q$, and a suitable tenoned head is provided and a washer is riveted down on the tenon-head of the pin $r$, the lugs and both sides of the swivel $q\ q$ will be held firmly in all but its horizontal rotating movement, and the bearings $p\ p$ at the upper ends of the swivel $q\ q$ will work free. By this horizontal rotating movement it will be seen that in connection with the vertical and longitudinal movement the operator can work the pounder up and down, to the right or left, or to and from the operator, thus reaching any point in the tub with the pounder, and still retain the pounder in the upright position and bring its face down square and flat on the goods, and by the weight of the pounder it will be held in its proper upright position. The goods are placed in the tub loosely, with sufficient water or suds to partly float them.

The pounder-head $e$ may be made of any suitable material; but I prefer metal, and will describe one made of heavy tin. The body $e$ is cone-shaped. The bottom edge is turned in toward the center, as shown, by leaving the wire a little short, and after the wire is placed the full size of the wire is thrown in toward the center of the cone by proper tools, such as are used by tinners in putting in the wire, and locking and turning the tin around it. It is also provided with a bead, $h$, into which the bottom of the internal inverted cup, $f$, is firmly attached, with its lower edge projecting down nearly as low as the bottom face of the pounder. The ferrule $i$ passes through the center of the bottom of the cup, and also through the small and upper end of the cone, which is flanged, as shown, and firmly attached at these points. The ferrule $i$ is made of suitable size to receive the lower end of the staff-handle $d$, and at right angles with the lower face of the pounder.

Having fully described the construction and use of my invention, what I claim is—

1. In a pounder washer, the lever consisting of the two parts $b\ c$, their connecting-clips bent to form an inclosure between the inner ends of said parts, and a rocking staff-clamp pivoted therein between the inner ends of the parts $b$ and $c$, in combination with a pounder-head and a pounder-head staff adjustable in said staff-clamp, substantially as and for the purpose described.

2. In a pounder washer, the lever consisting of the two parts $b\ c$ and the bent clips connecting them, in combination with a pivoted staff-clamp located between the inner ends of said lever and a thumb-screw passing through one of said clips, and a pounder-head having a staff passing through the staff-clamp, substantially as set forth.

3. The combination of a ferrule having trunnions integral therewith on two sides thereof, with a U-shaped swivel consisting of two L-shaped ears having bearings in their upper end, recesses $x'\ z$ in the lower end of one of them and lugs $x^2\ z^2$ in the other, with a tub-clamp having a vertical pin, $r$, passing through the horizontal portion of said ears and uniting them, substantially as set forth.

4. In a pounder washer, a staff-clamp for the vertical adjustment of the staff of a pounder-head, said clamp consisting of a cylindrical body having hollow trunnions, one of which is screw-tapped, in combination with a thumb-screw and the foot $x$ thereof, adapted to rock on its pivot, substantially as and for the purpose described.

GEORGE H. WALDO.

Witnesses:
N. S. WRIGHT,
M. B. O'DOGHERTY.